United States Patent
Mondal et al.

(10) Patent No.: US 11,962,531 B2
(45) Date of Patent: Apr. 16, 2024

(54) CHANNEL STATE INFORMATION REFERENCE SIGNAL (CSI-RS) AS PART OF DISCOVERY REFERENCE SIGNAL (DRS) CONFIGURATION AND INDICATION FOR NEW RADIO-UNLICENSED (NR-U)

(71) Applicant: Apple Inc., Cupertino, CA (US)

(72) Inventors: Bishwarup Mondal, San Ramon, CA (US); Yongjun Kwak, Portland, OR (US); Alexei Davydov, Nizhny Novgorod (RU); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 17/434,443

(22) PCT Filed: Mar. 27, 2020

(86) PCT No.: PCT/US2020/025364
§ 371 (c)(1),
(2) Date: Aug. 27, 2021

(87) PCT Pub. No.: WO2020/205573
PCT Pub. Date: Oct. 8, 2020

(65) Prior Publication Data
US 2022/0141065 A1    May 5, 2022

Related U.S. Application Data

(60) Provisional application No. 62/826,949, filed on Mar. 29, 2019.

(51) Int. Cl.
*H04L 5/00* (2006.01)
*H04L 27/26* (2006.01)
*H04B 7/06* (2006.01)
*H04W 16/14* (2009.01)

(52) U.S. Cl.
CPC ............ *H04L 5/005* (2013.01); *H04L 5/0051* (2013.01); *H04L 5/0094* (2013.01);
(Continued)

(58) Field of Classification Search
CPC ..... H04L 5/005; H04L 5/0051; H04L 5/0094; H04L 27/2613; H04B 7/0626; H04W 16/14
See application file for complete search history.

(56) References Cited

U.S. PATENT DOCUMENTS

| | | | |
|---|---|---|---|
| 2017/0134148 A1* | 5/2017 | Yerramalli | ............ H04L 5/0094 |
| 2017/0135029 A1* | 5/2017 | Chendamarai Kannan | ................. H04W 48/16 |
| 2018/0249339 A1 | 8/2018 | Noh et al. | |

FOREIGN PATENT DOCUMENTS

WO    20170074496 A1    5/2017

OTHER PUBLICATIONS

3rd Generation Partnership Project; Technical Specification Group Radio Access Network; NR; Physical layer procedures for data; (Release 15); 3GPP TS 38.214 V15.5.0 (Mar. 2019); http://www.3gpp.org.

(Continued)

*Primary Examiner* — Duc C Ho
(74) *Attorney, Agent, or Firm* — Eschweiler & Potashnik, LLC

(57) ABSTRACT

Systems, methods, and circuitries are provided for configuring and indicating channel state information resource signals (CSI-RS) using discovery reference signal (DRS) resources. An example method includes determining discovery reference signal (DRS) resources for use in carrying channel state information reference signals (CSI-RS); generating CSI-RS configuration information that defines at least one CSI-RS using the DRS resources; and signaling the CSI-RS configuration information to a user equipment (UE) device.

20 Claims, 3 Drawing Sheets

(52) U.S. Cl.
CPC ........ *H04L 27/2613* (2013.01); *H04B 7/0626* (2013.01); *H04W 16/14* (2013.01)

(56) References Cited

OTHER PUBLICATIONS

3rd Generation Partnership Project; Technical Specification Group Radio Access Network; NR; Physical channels and modulation; (Release 15); 3GPP TS 38.211 V15.5.0 (Mar. 2019); http://www.3gpp.org.

PCT Search Report dated May 4, 2020 in connection with PCT Application No. PCT/US2020/025364.

PCT Written Opinion dated May 4, 2020 in connection with PCT Application No. PCT/US2020/025364.

LG Electronics: "Initial access and mobility for NR-U" 3GPP Draft; R1-1902041; vol. Ran WG1; Feb. 16, 2019; URL:http://www.3gpp.org/ftp/ts%5Fran/WG1%5FRL1/TSGR1%5F96/Docs/R1%2D1902041%2Ezip.

Spreadtrum Communications: "Discussion on DRS in NR-U" 3GPP Draft; R1-1902736; vol. Ran WG1; Feb. 16, 2019; URL:http://www.3gpp.org/ftp/ts%5Fran/WG1%5FRL1/TSGR1%5F96/Docs/R1%2D1902736%2Ezip.

International Preliminary Report on Patentability dated Sep. 28, 2021 in connection with PCT Application No. PCT/US2020/025364.

\* cited by examiner

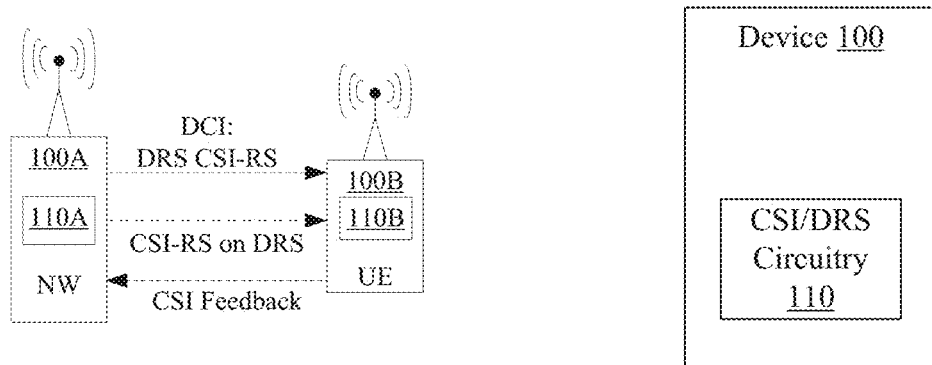
FIG. 1
FIG. 1A
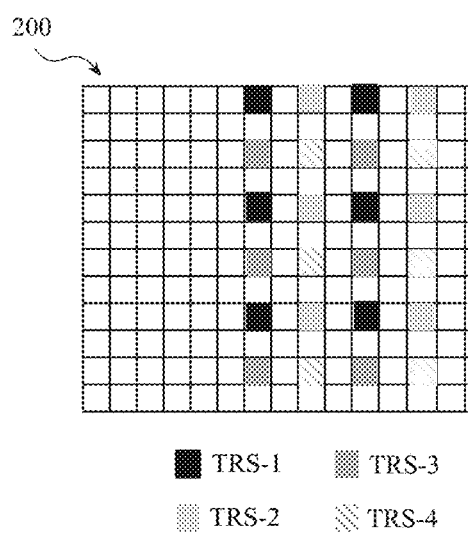
FIG. 2

CHANNEL STATE INFORMATION REFERENCE SIGNAL (CSI-RS) AS PART OF DISCOVERY REFERENCE SIGNAL (DRS) CONFIGURATION AND INDICATION FOR NEW RADIO-UNLICENSED (NR-U)

CROSS REFERENCE TO RELATED APPLICATIONS

This application is a National Phase entry application of International Patent Application No. PCT/US2020/025364 filed Mar. 27, 2020, which claims priority to U.S. Provisional Patent Application No. 62/826,949 filed on Mar. 29, 2019, entitled "CHANNEL STATE INFORMATION REFERENCE SIGNAL (CSI-RS) AS PART OF DISCOVERY REFERENCE SIGNAL (DRS) CONFIGURATION AND INDICATION FOR NEW RADIO-UNLICENSED (NR-U)," which is incorporated herein by reference for all purposes.

BACKGROUND

In New Radio-Unlicensed (NR-U) systems, channel state information resource signal (CSI-RS) is allowed as part of high priority discovery reference signal (DRS) transmissions.

BRIEF DESCRIPTION OF THE DRAWINGS

Some examples of circuits, apparatuses and/or methods will be described in the following by way of example only. In this context, reference will be made to the accompanying Figures.

FIG. 1 is a block diagram illustrating an example wireless communication network in which CSI-RS are sent and/or received by way of DRS transmissions, according to various aspects disclosed according to various aspects disclosed.

FIG. 1A is a block diagram illustrating an example wireless communication device configured to send and/or receive CSI-RS by way of discovery resource signals, according to various aspects disclosed.

FIG. 2 illustrates an example physical resource block that includes 4 tracking resource signal configurations, according to various aspects disclosed.

DETAILED DESCRIPTION

The present disclosure is described with reference to the attached figures. The figures are not drawn to scale and they are provided merely to illustrate the disclosure. Several aspects of the disclosure are described below with reference to example applications/use cases for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Figure 5:
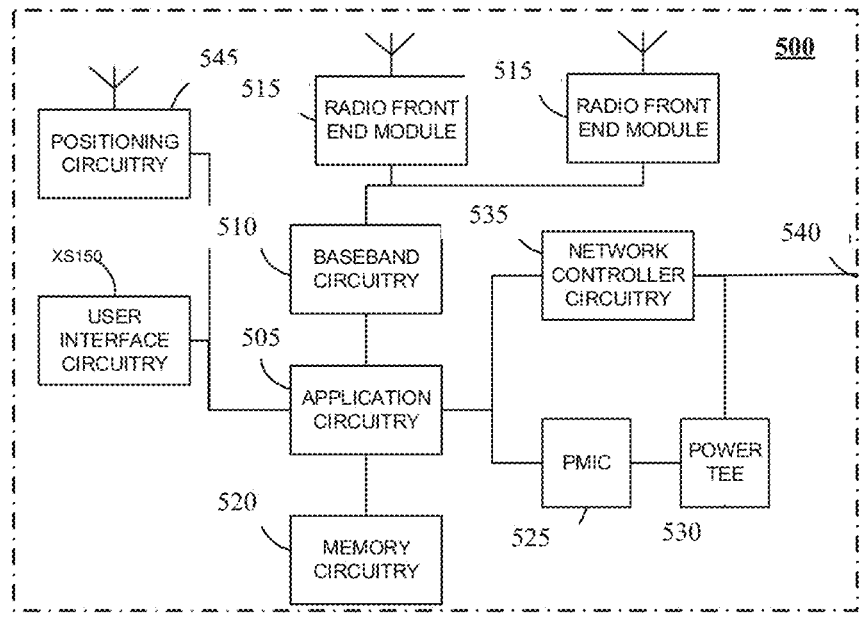
FIG. 5 illustrates an example of an infrastructure equipment device (e.g., NW or eNB), in accordance with various aspects disclosed.
Figure 6:
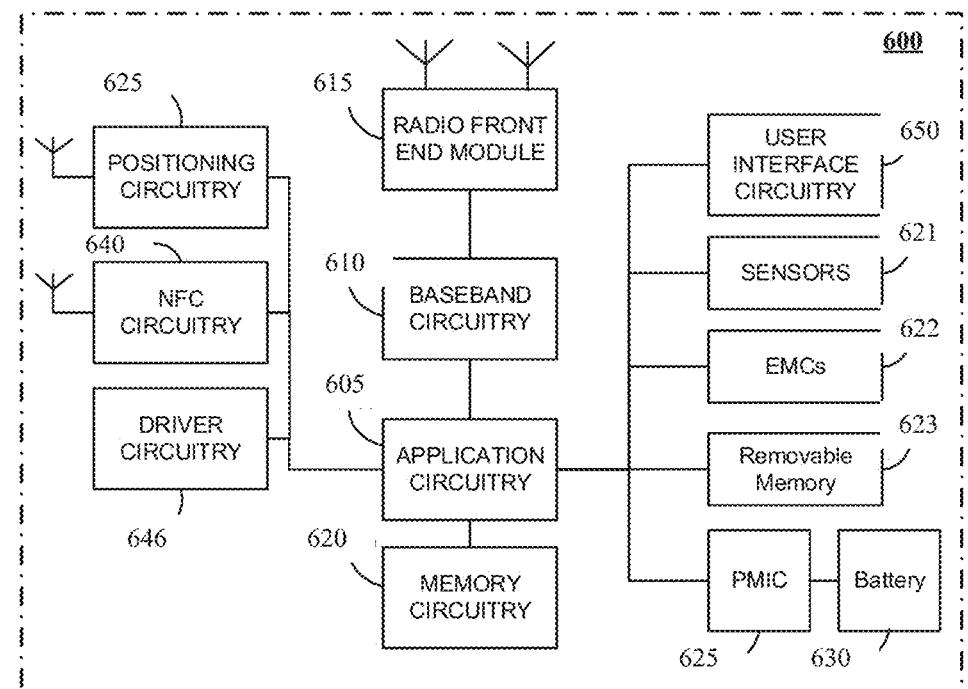
FIG. 6 illustrates an example of a user equipment device (e.g., UE), in accordance with various aspects disclosed.

FIG. 1 illustrates a wireless network that includes two wireless communication devices 100A and 100B that serve as a network (NW) node and user equipment (UE), respectively. An example wireless communication network is described in more detail with reference to FIG. 4 in which the NW node 100A is illustrated as a RAN node 411 and UE 100B is illustrated as UE 400. As shown in FIG. 1A, the wireless communication devices 100 include CSI/DRS circuitry 110 (e.g., a baseband processor or one or more processors) that is configured to cause the device to configure, indicate, transmit, and/or receive channel state information resource signals (CSI-RS) on discovery reference signals (DRS) resources. In the following description, when a device 100 is described as performing some function, it is to be understood that the CSI/DRS circuitry 110 is causing the device to perform the function. In one example, the CSI/DRS circuitry 110 includes a processor (e.g., a baseband processor) executing stored instructions to perform the function. An example NW node device is illustrated in FIG. 5 and an example UE device is illustrated in FIG. 6.

In order to facilitate communication with the UE 100B, the NW node 100A transmits channel state information resource signals (CSI-RS) that are received and measured by the UE 100B. The UE 100B generates a CSI report or feedback that communicates the results of the measurements to the NW node 100A. In this manner the UE 100B characterizes the channel for the NW node 100A.

The NW node 100A informs the UE 100B about which resources will be used to transmit the CSI-RS using, in one example, downlink control information (DCI). A CSI-RS configuration defines many different parameters regarding CSI-RS including, for example, time and frequency resources that will carry the CSI-RS, repetition patterns or periodicity of the CSI-RS, and also which measurements and report quantities should be provided by the UE in the CSI feedback.

When the network is operating in unlicensed spectrum, many communications are subject to listen-before-talk (LBT) procedures which may delay or even prevent the transmission of DCI. Different categories of LBT are assigned to different types of signals based on the signal's priority, with each category having a different amount of time during which a transmitter must detect a clear channel before transmitting. For example, discovery reference signals (DRS) may be assigned a category-2 LBT while downlink signals are assigned a category-4 LBT. This means that DRS have a higher priority than the downlink signal and DRS because the NW node 100A does not need to detect a clear channel for as long before transmitting DRS as before transmitting downlink signals (e,g., DCI). Thus, DRS are more likely to be transmitted (due to meeting the LBT requirement) than DCI signals transmitted using category-4 LBT.

Described herein are systems, methods, and circuitries for enabling the transmission of CSI-RS on DRS resources to allow the NW node 100A to transmit CSI-RS for essential purposes like RLM or time-frequency offset tracking using a higher priority channel access mechanism. To this end the NW node 100A transmits one or more CSI-RS configurations that define DRS resources for use in transmitting CSI-RS (e.g., by way of DCI that defines DRS CSI-RS resources as shown in FIG. 1). Described herein are a set of CSI-RS configurations. In some examples, the NW node 100A (e.g., RAN node 411 of FIG. 4) is able to define a set of configurations and signal these configurations to a UE (e.g., UE 400 of FIG. 4) using higher layer signaling. In examples, the configurations are defined relative to an associated SSB in a slot. In some examples, at least one CSI-RS configuration of a set of CSI-RS configurations may be indicated using broadcast DCI (scrambled with a fixed RNTI) or using group-cast DCI (scrambled using a configured RNTI).

Configuration of CSI-RS as Part of DRS

The CSI-RS-ResourceConfigMobility IE, which may be included in a suitable RRC message, is used to configure CSI-RS based RRM measurements. CSI-RS can be configured as part of DRS that allows CSI-RS transmission to take advantage of the high-priority DRS transmission opportunities, for example, by using Cat-2 LBT in unlicensed band. This CSI-RS is not triggered or periodic or semi-persistent. This can be configured using the (or similar) CSI-RS-ResourceConfigMobility IE only modifying the slotConfig field/structure as highlighted in the CSI-RS-ResourceConfigMobility IE shown in the IE description below (with modifications in bold).

```
-- ASN1START
-- TAG-CSI-RS-RESOURCECONFIGMOBILITY-START
CSI-RS-ResourceConfigMobility ::=          SEQUENCE {
   subcarrierSpacing                       SubcarrierSpacing,
   csi-RS-CellList-Mobility                SEQUENCE (SIZE (1..maxNrofCSI-RS-CellsRRM))
                                           OF CSI-
RS-CellMobility,
   ... ,
   [[
   refServCellIndex-v1530                  ServCellIndex
   OPTIONAL -- Need S
   ]]
}
CSI-RS-CellMobility ::=                    SEQUENCE {
   cellId                                  PhysCellId,
   csi-rs-MeasurementBW                    SEQUENCE {
      nrofPRBs                             ENUMERATED {size24, size48, size96, size192, size264},
      startPRB                             INTEGER(0..2169)
   },
   density                                 ENUMERATED {d1,d3}
   OPTIONAL,  -- Need R
   csi-rs-ResourceList-Mobility            SEQUENCE (SIZE (1..maxNrofCSI-RS-ResourcesRRM))
OF CSI-RS-Resource-Mobility
}
CSI-RS-Resource-Mobility ::=               SEQUENCE {
   csi-RS-Index                            CSI-RS-Index,
   slotConfig                              CHOICE {
      ms4                                  INTEGER (0..31),
      ms5                                  INTEGER (0..39),
      ms10                                 INTEGER (0..79),
      ms20                                 INTEGER (0..159),
      ms40                                 INTEGER (0..319)
   },
   associatedSSB                           SEQUENCE {
      ssb-Index                            SSB-Index,
      isQuasiColocated                     BOOLEAN
   }                                       OPTIONAL, -- Need R
   frequencyDomainAllocation               CHOICE {
      row1                                 BIT STRING (SIZE (4)),
      row2                                 BIT STRING (SIZE (12))
   },
   firstOFDMSymbolInTimeDomain             INTEGER (0..13),
   sequenceGenerationConfig                INTEGER (0..1023),
   ...
}
CSI-RS-Index ::=                           INTEGER (0..maxNrofCSI-RS-ResourcesRRM-1)
-- TAG-CSI-RS-RESOURCECONFIGMOBILITY-STOP
-- ASN1STOP
```

Relevant field descriptions for the modified IE are summarized in the following table.

TABLE 1

| CSI-RS-CellMobility field descriptions |
|---|
| csi-rs-ResourceList-Mobility |
| List of CSI-RS resources for mobility. The maximum number of CSI-RS resources that can be configured per frequency layer depends on the configuration of associatedSSB (see 3GPP TS 38.214, clause 5.1.6.1.3). |
| density |

TABLE 1-continued

Frequency domain density for the 1-port CSI-RS for L3 mobility Corresponds to L1 parameter 'Density'
nrofPRBs Allowed size of the measurement BW in PRBs Corresponds to L1 parameter 'CSI-RS-measurementBW-size'.
startPRB Starting PRB index of the measurement bandwidth Corresponds to L1 parameter 'CSI-RS-measurement-BW-start' Upper edge of value range unclear in RAN1.
CSI-RS-ResourceConfigMobility field descriptions csi-RS-CellList-Mobility List of cells
refServCellIndex Indicates the serving cell providing the timing reference for CSI-RS resources without associatedSSB. The field may be present only if there is at least one CSI-RS resource configured without associatedSSB. In case there is at least one CSI-RS resource configured without associatedSSB and this field is absent, the UE shall use the timing of the PCell. The CSI-RS resources and the serving cell indicated by refServCellIndex for timing reference should be located in the same band.
subcarrierSpacing Subcarrier spacing of CSI-RS. Only the values 15, 30 or 60 kHz (<6 GHz), 60 or 120 kHz (>6 GHz) are applicable.
CSI-RS-Resource-Mobility field descriptions associatedSSB If this field is present, the UE may base the timing of the CSI-RS resource indicated in CSI-RS-Resource-Mobility on the timing of the cell indicated by the cellId in the CSI-RS-CellMobility. In this case, the UE is not required to monitor that CSI-RS resource if the UE cannot detect the SS/PBCH block indicated by this associatedSSB and cellId. If this field is absent, the UE shall base the timing of the CSI-RS resource indicated in CSI-RS-Resource-Mobility on the timing of the serving cell indicated by refServCellIndex. In this case, the UE is required to measure the CSI-RS resource even if SS/PBCH block(s) with cellId in the CSI-RS-CellMobility are not detected.
CSI-RS resources with and without associatedSSB may be configured in accordance with the rules in 3GPP TS 38.214, clause 5.1.6.1.3.
csi-RS-Index CSI-RS resource index associated to the CSI-RS resource to be measured (and used for reporting).
firstOFDMSymbolInTimeDomain Time domain allocation within a physical resource block. The field indicates the first OFDM symbol in the PRB used for CSI-RS, see 3GPP TS 38.211, clause 7.4.1.5.3. Value 2 is supported only when DL-DMRS-typeA-pos equals 3.
frequencyDomainAllocation Frequency domain allocation within a physical resource block in accordance with TS 38.211 [16], clause 7.4.1.5.3 including table 7.4.1.5.2-1. The number of bits that may be set to one depend on the chosen row in that table. For the choice "other", the row can be determined from the parameters below and from the number of bits set to 1 in frequencyDomainAllocation.
isQuasiColocated The CSI-RS resource is either QCL'ed not QCL'ed with the associated SSB in spatial parameters (see 3GPP TS 38.214, clause 5.1.6.1.3.
sequenceGenerationConfig Scrambling ID for CSI-RS (see 3GPP TS 38.211, clause 7.4.1.5.2).
slotConfig Indicates the CSI-RS periodicity (in milliseconds) and for each periodicity the offset (in number of slots). When subcarrierSpacingCSI-RS is set to 15 kHZ, the maximum offset values for periodicities ms4/ms5/ms10/ms20/ms40 are 3/4/9/19/39 slots. When subcarrierSpacingCSI-RS is set to 30 kHZ, the maximum offset values for periodicities ms4/ms5/ms10/ms20/ms40 are 7/9/19/39/79 slots. When subcarrierSpacingCSI-RS is set to 60 kHZ, the maximum offset values for periodicities ms4/ms5/ms10/ms20/ms40 are 15/19/39/79/159 slots. When subcarrierSpacingCSI-RS is set 120 kHZ, the maximum offset values for periodicities ms4/ms5/ms10/ms20/ms40 are 31/39/79/159/319 slots.

For CSI-RS in NR-U, SlotConfig (e.g., as highlighted in the above example) should not be used. Instead, the slot where CSI-RS occurs can be determined relative to an associatedSSB. Note that the above example CSI-RS-ResourceConfigMobility IE includes an associatedSSB field. In one example, the CSI-RS may occur in the same slot as associatedSSB and in such case no indication is necessary. In another example, it is indicated whether CSI-RS occurs in the same slot as the associatedSSB or in the subsequent slot. The CSI-RS is not exactly periodic as mentioned above, but the observation window at the UE is periodic and determined by a synchronization symbol physical broadcast measurement block measurement time configuration (SMTC) or a window configured in the same manner. Thus, a modified CSI-RS-ResourceConfigMobility IE together with an SMTC window configuration (or similar) allows the UE to measure CSI-RS that is transmitted as part of DRS.

Indication of CSI-RS as Part of DRS

In one example, the NW node signals a presence indication of CSI-RS as part of DRS (e.g., RS or CSI-RS with repetition set to ON) for RLM or time-frequency tracking or Rx beam training purposes A broadcast or group-cast DCI can be used for indicating the presence of TRS. A cell-wide broadcast can be used with DCI format 1_0 scrambled with SI_RNTI or a group specific broadcast can be used similar to DCI format 2_0 scrambled with SFI_RNTI. Or new DCI format may be defined which is scrambled with newly introduced RNTI (e.g., TRS-RNTI). A certain set of CSI-RS configurations can be specified and an index identifying a particular configuration can be indicated in the broadcast DCI (using SI_RNTI for example). Even for this case, some of the CSI-RS configuration can be pre-configured by RRC and remaining configuration(s) can be indicated in the broadcast DCI. If a group-cast mechanism is used, a certain set of configurations can be configured to a group of UEs and an index identifying a particular configuration can be indicated in the group-cast DCI. For this case, some of the CSI-RS configuration can be pre-configured by RRC and the remaining configuration can be indicated in the group-cast DCI. All or part of the fields in Table 2 can be used to describe a TRS configuration where the slot index is relative to an associated SSB.

TABLE 2

| Parameters | slot index with reference to i-th SSB | first symbol in the first slot | first symbol in the second slot (if present) | frequency-domain resource allocation |
|---|---|---|---|---|
| Possible values | $n_c = n_{SSB,i}$ only or $n_c = n_{SSB,i}$, $n_c = n_{SSB,i} + 1$ | [0, . . . , 13] | [0, . . . , 13] | row1 [2 bits] |

The example above is for TRS where density, number of ports, and BW are fixed. An example set of configurations shown by FIG. 3.

Following are one or more flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein the term generate, when used with reference to a signal, should be construed broadly as encompassing any manner of calculating, computing, selecting from amongst stored signal options, or otherwise determining a signal using a processor and processing the signal for communication to another device.

Figure 3:
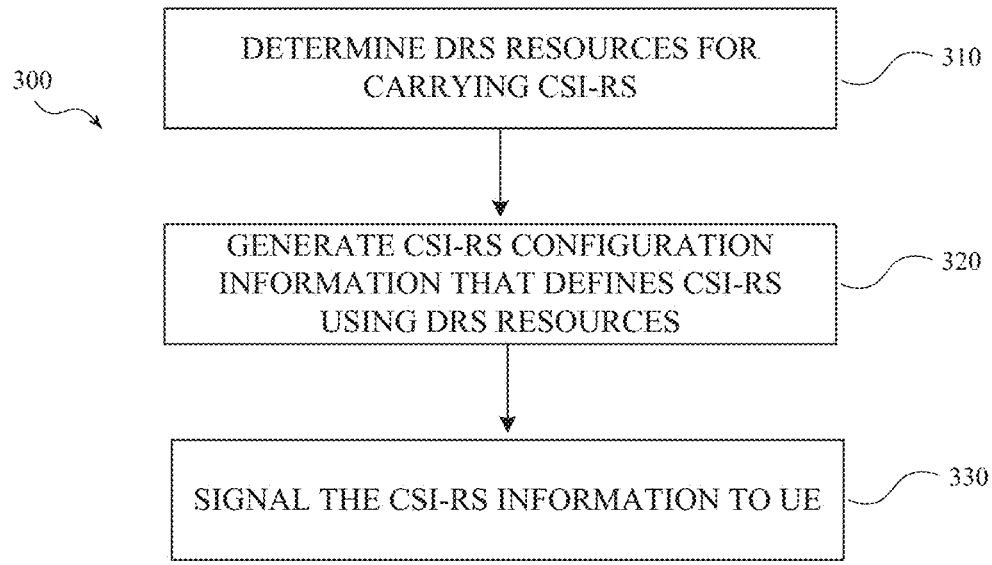
FIG. 3 is a flow diagram illustrating an example method for configuring and signaling CSI-RS using DRS resources, according to various aspects disclosed.

FIG. 3 depicts a flow diagram outlining an example method 300 for using DRS to transmit CSI-RS. The method includes, at 310, determining discovery reference signal (DRS) resources for use in carrying channel state information reference signals (CSI-RS). At 320 CSI-RS configuration information is generated that defines at least one CSI-RS using the DRS resources. The CSI-RS configuration information is signaled to a user equipment (UE) device at 330.

Figure 4:
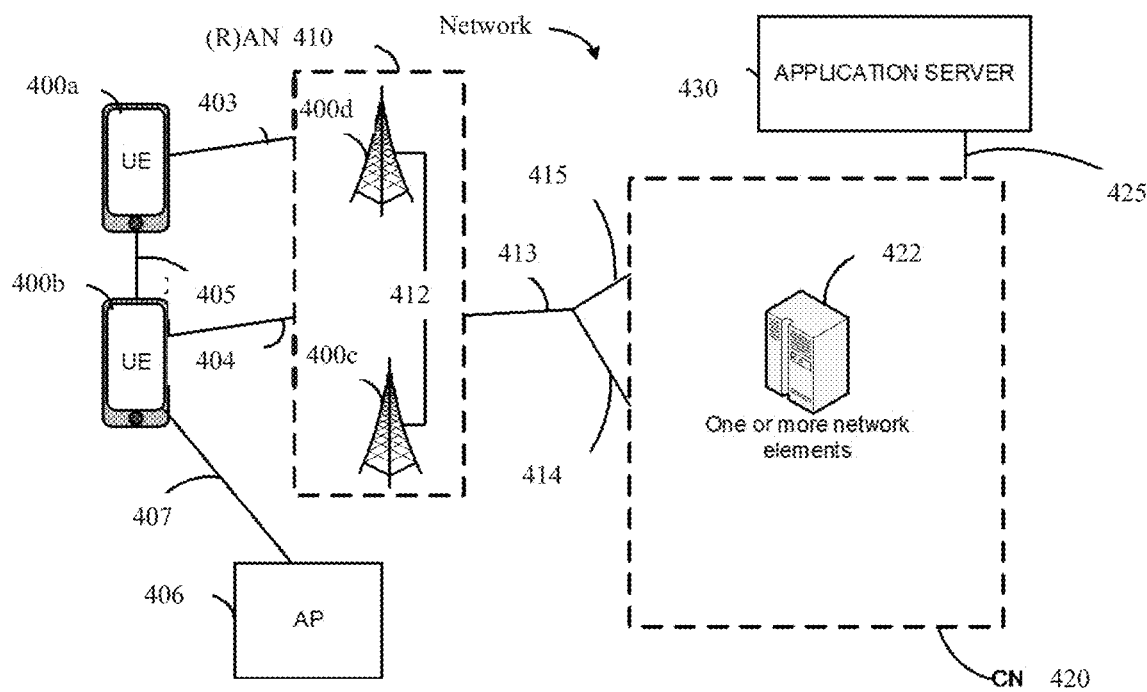
FIG. 4 illustrates an example communication network, in accordance with various aspects disclosed.

FIG. 4 illustrates an example architecture of a communication network, in accordance with various embodiments. The following description is provided for an example network that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 4, the network includes UE 400a and UE 400b (collectively referred to as "UEs 400" or "UE 400"). In this example, UEs 400 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 400 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 400 may be configured to connect, for example, communicatively couple, with a RAN 410. In embodiments, the RAN 410 may be an NG RAN or a 5G RAN, an E-UTRAN, or a legacy RAN, such as a UTRAN or GERAN. As used herein, the term "NG RAN" or the like may refer to a RAN 410 that operates in an NR or 5G system 400, and the term "E-UTRAN" or the like may refer to a RAN 410 that operates in an LTE or 4G system 400. The UEs 400 utilize connections (or channels) 403 and 404, respectively, each of which comprises a physical communications interface or layer (discussed in further detail below).

In this example, the connections 403 and 404 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 400 may directly exchange communication data via a ProSe interface 405. The ProSe interface 405 may alternatively be referred to as a SL interface 405 and may comprise one or more logical channels, including but not limited to a PSCCH, a PSSCH, a PSDCH, and a PSBCH.

The UE 400b is shown to be configured to access an AP 406 (also referred to as "WLAN node 406," "WLAN 406," "WLAN Termination 406," "WT 406" or the like) via connection 407. The connection 407 can comprise a local wireless connection, such as a connection consistent with any IEEE 802.11 protocol, wherein the AP 406 would comprise a wireless fidelity (Wi-Fi®) router. In this example, the AP 406 is shown to be connected to the Internet without connecting to the core network of the wireless system (described in further detail below). In various embodiments, the UE 400b, RAN 410, and AP 406 may be configured to utilize LWA operation and/or LWIP operation. The LWA operation may involve the UE 400b in RRC_CONNECTED being configured by a RAN node 411a-b to utilize radio resources of LTE and WLAN. LWIP operation may involve the UE 400b using WLAN radio resources (e.g., connection 407) via IPsec protocol tunneling to authenticate and encrypt packets (e.g., IP packets) sent over the connection 407. IPsec tunneling may include encapsulating the entirety of original IP packets and adding a new packet header, thereby protecting the original header of the IP packets.

The RAN 410 can include one or more AN nodes or RAN nodes 411a and 411b (collectively referred to as "RAN nodes 411" or "RAN node 411") that enable the connections 403 and 404. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 411 that operates in an NR or 5G system 400 (for example, a gNB), and the term "E-UTRAN node" or the like may refer to a RAN node 411 that operates in an LTE or 4G system 400 (e.g., an eNB). According to various embodiments, the RAN nodes 411 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, a downlink resource grid can be used for downlink transmissions from any of the RAN nodes 411 to the UEs 400, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 400 and the RAN nodes 411 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 400 and the RAN nodes 411 may operate using LAA, eLAA, and/or feLAA mechanisms. In these implementations, the UEs 400 and the RAN nodes 411 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 400, RAN nodes 411, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 400, AP 406, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MOOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different path losses. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 400 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 400. The PDCCH carries information about the transport format and resource allocations related to the PDSCH channel, among other things. It may also inform the UEs 400 about the transport format, resource allocation, and HARQ information related to the uplink shared channel. Typically, downlink scheduling (assigning control and shared channel resource blocks to the UE 400b within a cell) may be performed at any of the RAN nodes 411 based on channel quality information fed back from any of the UEs 400. The downlink resource assignment information may be sent on the PDCCH used for (e.g., assigned to) each of the UEs 400.

The RAN 410 is shown to be communicatively coupled to a core network—in this embodiment, core network (CN) 420. The CN 420 may comprise a plurality of network elements 422, which are configured to offer various data and telecommunications services to customers/subscribers (e.g., users of UEs 400) who are connected to the CN 420 via the RAN 410. The components of the CN 420 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 420 may be referred to as a network slice, and a logical instantiation of a portion of the CN 420 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

FIG. 5 illustrates an example of infrastructure equipment device 500 in accordance with various embodiments. The infrastructure equipment device 500 (or "device 500") may be implemented as a base station, radio head, RAN node such as the RAN nodes 411 and/or AP 406 shown and described previously, application server(s) 430, and/or any other element/device discussed herein. In other examples, the device 500 could be implemented in or by a UE. The device 500 may be configured to function as a NW node that transmits CSI-RS on DRS resources.

The system 500 includes application circuitry 505, baseband circuitry 510 (e.g., CSI/DRS circuitry 110 of FIG. 1A), one or more radio front end modules (RFEMs) 515, memory circuitry 520, power management integrated circuitry (PMIC) 525, power tee circuitry 530, network controller circuitry 535, network interface connector 540, satellite positioning circuitry 545, and user interface 550. In some embodiments, the device 500 may include additional elements such as, for example, memory/storage, display, camera, sensor, or input/output (I/O) interface. In other embodiments, the components described below may be included in more than one device. For example, said circuitries may be separately included in more than one device for GRAN, vBBU, or other like implementations.

Application circuitry 505 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 505 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 505 may comprise, or may be, a special-purpose processor/controller to operate according to the various embodiments herein. As examples, the processor(s) of application circuitry 505 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 500 may not utilize application circuitry 505, and instead may include a special-purpose processor/controller to process IP data received from an EPC or 5GC, for example.

User interface circuitry 550 may include one or more user interfaces designed to enable user interaction with the system 500 or peripheral component interfaces designed to enable peripheral component interaction with the system 500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 5 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an 120 interface, an SPI interface, point to point interfaces, and a power bus, among others.

FIG. 6 illustrates an example of a device 600 in accordance with various embodiments. In embodiments, the device 600 may be suitable for use as UE 100A of FIG. 1, UE 400 of FIG. 4, and/or any other element/device discussed herein. The device 600 may include any combinations of the components shown in the example. The components of device 600 may be implemented as integrated circuits (ICs), portions thereof, discrete electronic devices, or other modules, logic, hardware, software, firmware, or a combination thereof adapted in the device 600, or as components otherwise incorporated within a chassis of a larger system. The block diagram of FIG. 6 is intended to show a high level view of components of the device 600. However, some of the components shown may be omitted, additional components may be present, and different arrangement of the components shown may occur in other implementations.

Application circuitry 605 includes circuitry such as, but not limited to one or more processors (or processor cores), cache memory, and one or more of LDOs, interrupt controllers, serial interfaces such as SPI, 120 or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 605 may be coupled with or may include memory/storage elements and may be configured to execute instructions stored in the memory/storage to enable various applications or operating systems to run on the device 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 605 may include a general or special purpose processor, such as an A-series processor (e.g., the A13 Bionic), available from Apple® Inc., Cupertino, CA or any other such processor. The processors of the application circuitry 605 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 605 may be a part of a system on a chip (SoC) in which the application circuitry 605 and other components are formed into a single integrated circuit, or a single package.

The baseband circuitry 610 (e.g., CSI/DRS circuitry 110 of FIG. 1A) may be implemented, for example, as a solder-down substrate including one or more integrated circuits, a single packaged integrated circuit soldered to a main circuit board or a multi-chip module containing two or more integrated circuits.

The device 600 may also include interface circuitry (not shown) that is used to connect external devices with the device 600. The external devices connected to the device 600 via the interface circuitry include sensor circuitry 621 and electro-mechanical components (EMCs) 622, as well as removable memory devices coupled to removable memory circuitry 623.

A battery 630 may power the platform 600, although in some examples the device 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is an apparatus for a wireless communication device (device) serving as a network (NW) node in a wireless network, including one or more processors configured to cause the device to: determine discovery reference signal (DRS) resources for use in carrying channel state information reference signals (CSI-RS); generate CSI-RS configuration information that defines at least one CSI-RS using the DRS resources; and signal the CSI-RS configuration information to a user equipment (UE) device.

Example 2 includes the subject matter of example 1, including or omitting optional subject matter, wherein the one or more processors are configured to cause the device to generate the CSI-RS configuration to define a slot for the CSI-RS relative to a slot that includes an associated synchronization symbol block (SSB).

Example 3 includes the subject matter of example 2, including or omitting optional subject matter, wherein the one or more processors are configured to cause the device to generate the CSI-RS configuration to define the slot that includes the associated synchronization symbol block (SSB) for the CSI-RS.

Example 4 includes the subject matter of example 2, including or omitting optional subject matter, wherein the one or more processors are configured to cause the device to generate the CSI-RS configuration to define a slot immediately subsequent the slot that includes the associated synchronization symbol block (SSB) for the CSI-RS.

Example 5 includes the subject matter of example 2, including or omitting optional subject matter, wherein the one or more processors are configured to cause the device to generate the CSI-RS configuration to define a slot for the CSI-RS relative to a slot that includes the associated synchronization symbol block (SSB) identified in an associatedSSB field of a ResourceConfigMobility information element (IE).

Example 6 includes the subject matter of example 1, including or omitting optional subject matter, wherein the one or more processors are configured to cause the device to generate the CSI-RS configuration by modifying a slotConfig field in a ResourceConfigMobility information element IE to refer to a slot in the DRS resources.

Example 7 includes the subject matter of any one of examples 1-6, including or omitting optional subject matter, wherein the one or more processors are configured to cause the device to signal the CSI-RS configuration to the UE using a broadcast downlink control information (DCI) transmission.

Example 8 includes the subject matter of any one of examples 1-6, including or omitting optional subject matter, wherein the one or more processors are configured to cause the device to signal the CSI-RS configuration to the UE using a groupcast DCI transmission.

Example 9 includes the subject matter of any one of examples 1-6, including or omitting optional subject matter, wherein the one or more processors are configured to cause the device to select a CSI-RS configuration from amongst a set of CSI_RS configurations for a group of UEs to which the UE belongs; and transmit an index identifying the selected CSI-RS to the UE in a broadcast DCI transmission.

Example 10 includes the subject matter of any one of examples 1-6, including or omitting optional subject matter, wherein the one or more processors are configured to cause the device to select a CSI-RS configuration from amongst a set of CSI_RS configurations for a group of UEs to which the UE belongs; and transmit an index identifying the selected CSI-RS to the UE in a groupcast DCI transmission.

Example 11 includes the subject matter of example 10, including or omitting optional subject matter, wherein the one or more processors are configured to cause the device to transmit one or more CSI-RS configurations in the set to the UE using radio resource control (RRC) signaling; and select the CSI-RS configuration from CSI-RS configurations in the set that are not transmitted using RRC signaling.

Example 12 includes the subject matter of any one of examples 1-6, including or omitting optional subject matter, wherein the CSI-RS includes a tracking reference signal (TRS).

Example 13 is a method, including with a wireless communication device (device) serving as a network (NW) node in a wireless network: determining discovery reference signal (DRS) resources for use in carrying channel state information reference signals (CSI-RS); generating CSI-RS configuration information that defines at least one CSI-RS using the DRS resources; and signaling the CSI-RS configuration information to a user equipment (UE) device.

Example 14 includes the subject matter of example 13, including or omitting optional subject matter, including generating the CSI-RS configuration to define a slot for the CSI-RS relative to a slot that includes an associated synchronization symbol block (SSB).

Example 15 includes the subject matter of example 14, including or omitting optional subject matter, including generating the CSI-RS configuration to define the slot that includes the associated synchronization symbol block (SSB) for the CSI-RS.

Example 16 includes the subject matter of example 14, including or omitting optional subject matter, including generating the CSI-RS configuration to define a slot immediately subsequent the slot that includes the associated synchronization symbol block (SSB) for the CSI-RS.

Example 17 includes the subject matter of example 14, including or omitting optional subject matter, including generating the CSI-RS configuration to define a slot for the CSI-RS relative to a slot that includes the associated synchronization symbol block (SSB) identified in an associatedSSB field of a ResourceConfigMobility information element (IE).

Example 18 includes the subject matter of example 13, including or omitting optional subject matter, including generating the CSI-RS configuration by modifying a slotConfig field in a ResourceConfigMobility information element IE to refer to a slot in the DRS resources.

Example 19 includes the subject matter of any one of examples 13-18, including or omitting optional subject matter, including signaling the CSI-RS configuration to the UE using a broadcast downlink control information (DCI) transmission.

Example 20 includes the subject matter of any one of examples 13-18, including or omitting optional subject matter, including signaling the CSI-RS configuration to the UE using a groupcast DCI transmission.

Example 21 includes the subject matter of any one of examples 13-18, including or omitting optional subject matter, including selecting a CSI-RS configuration from amongst a set of CSI_RS configurations for a group of UEs to which the UE belongs; and transmitting an index identifying the selected CSI-RS to the UE in a broadcast DCI transmission.

Example 22 includes the subject matter of any one of examples 13-18, including or omitting optional subject matter, including selecting a CSI-RS configuration from amongst a set of CSI_RS configurations for a group of UEs to which the UE belongs; and transmitting an index identifying the selected CSI-RS to the UE in a groupcast DCI transmission.

Example 23 includes the subject matter of example 22, including or omitting optional subject matter, including transmitting one or more CSI-RS configurations in the set to the UE using radio resource control (RRC) signaling; and selecting the CSI-RS configuration from CSI-RS configurations in the set that are not transmitted using RRC signaling.

Example 24 is an apparatus for a user equipment (UE) wireless communication device (device) connected in a wireless network, including one or more processors configured to cause the device to: receive, from a network (NW) node, channel state information reference signal (CSI-RS) configuration information that defines at least one CSI-RS using the discovery reference signal (DRS) resources; monitor the DRS resources for the CSI-RS; measure CSI-RS received on the DRS resources to generate CSI information; and transmit the CSI information to the NW node.

Example 25 includes the subject matter of example 24, including or omitting optional subject matter, wherein the CSI-RS configuration defines a slot for the CSI-RS relative to a slot that includes an associated synchronization symbol block (SSB).

Example 26 includes the subject matter of example 25, including or omitting optional subject matter, wherein the CSI-RS configuration defines the slot that includes the associated synchronization symbol block (SSB) for the CSI-RS.

Example 27 includes the subject matter of example 25, including or omitting optional subject matter, wherein the CSI-RS configuration defines a slot immediately subsequent the slot that includes the associated synchronization symbol block (SSB) for the CSI-RS.

Example 28 includes the subject matter of example 25, including or omitting optional subject matter, wherein the CSI-RS configuration defines a slot for the CSI-RS relative to the slot that includes the associated synchronization symbol block (SSB) identified in an associatedSSB field of a ResourceConfigMobility information element (1E).

Example 29 includes the subject matter of example 25, including or omitting optional subject matter, wherein the CSI-RS configuration comprises a slotConfig field in a ResourceConfigMobility information element IE that refers to a slot in the DRS resources.

Example 30 includes the subject matter of any one of examples 24-29, including or omitting optional subject matter, wherein the one or more processors are configured to cause the device to receive the CSI-RS configuration in a broadcast downlink control information (DCI) transmission.

Example 31 includes the subject matter of any one of examples 24-29, including or omitting optional subject matter, wherein the one or more processors are configured to cause the device to receive the CSI-RS configuration to the UE in a groupcast DCI transmission.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor, configured to perform operations comprising:
    determining discovery reference signal (DRS) resources for use in carrying channel state information reference signals (CSI-RS);
    generating CSI-RS configuration information that defines at least one CSI-RS using the DRS resources; and
    instructing a transceiver to signal the CSI-RS configuration information to a user equipment (UE).

2. The baseband processor of claim 1, further configured to:
    generate the CSI-RS configuration information to define a slot for the CSI-RS relative to a slot that includes an associated synchronization symbol block (SSB).

3. The baseband processor of claim 2, further configured to:
    generate the CSI-RS configuration information to define the slot that includes the associated synchronization symbol block (SSB) for the CSI-RS.

4. The baseband processor of claim 2, further configured to:
    generate the CSI-RS configuration information to define a slot immediately subsequent the slot that includes the associated synchronization symbol block (SSB) for the CSI-RS.

5. The baseband processor of claim 2, further configured to:
    generate the CSI-RS configuration information to define a slot for the CSI-RS relative to a slot that includes the associated synchronization symbol block (SSB) identified in an associatedSSB field of a ResourceConfigMobility information element (IE).

6. The NW node of claim 5, further configured to:
select a CSI-RS configuration from amongst a set of CSI-RS configurations for a group of UEs to which the UE belongs; and
transmit an index identifying the selected CSI-RS configuration to the UE in a groupcast DCI transmission.

7. The baseband processor of claim 1, further configured to:
generate the CSI-RS configuration information by modifying a slotConfig field in a ResourceConfigMobility information element IE to refer to a slot in the DRS resources.

8. The baseband processor of claim 7, further configured to:
signal the CSI-RS configuration information to the UE using a broadcast downlink control information (DCI) transmission.

9. The baseband processor of claim 1, further configured to:
select a CSI-RS configuration from amongst a set of CSI-RS configurations for a group of UEs to which the UE belongs; and
transmit an index identifying the selected CSI-RS configuration to the UE in a broadcast DCI transmission.

10. The baseband processor of claim 7, wherein the CSI-RS comprises a tracking reference signal (TRS).

11. A method, comprising with a network (NW) node in a wireless network:
determining discovery reference signal (DRS) resources for use in carrying channel state information reference signals (CSI-RS);
generating CSI-RS configuration information that defines at least one CSI-RS using the DRS resources; and
signaling the CSI-RS configuration information to a user equipment (UE).

12. The method of claim 11, comprising:
generating the CSI-RS configuration information to define a slot for the CSI-RS relative to a slot that includes an associated synchronization symbol block (SSB).

13. The method of claim 12, comprising:
generating the CSI-RS configuration information to define a slot immediately subsequent the slot that includes the associated synchronization symbol block (SSB) for the CSI-RS.

14. The method of claim 13, comprising:
selecting a CSI-RS configuration from amongst a set of CSI_RS configurations for a group of UEs to which the UE device belongs; and
transmitting an index identifying the selected CSI-RS configuration to the UE in a broadcast DCI transmission.

15. The method of claim 12, comprising:
generating the CSI-RS configuration information to define a slot for the CSI-RS relative to a slot that includes the associated synchronization symbol block (SSB) identified in an associatedSSB field of a ResourceConfigMobility information element (IE).

16. The method of claim 12, comprising:
signaling the CSI-RS configuration information to the UE using a broadcast downlink control information (DCI) transmission.

17. A user equipment (UE), comprising a memory and one or more processors configured to, when executing instructions stored in the memory, cause the UE to:
receive, from a network (NW) node, channel state information reference signal (CSI-RS) configuration information that defines at least one CSI-RS using discovery reference signal (DRS) resources;
monitor the DRS resources for the CSI-RS;
measure CSI-RS received on the DRS resources to generate CSI information; and
transmit the CSI information to the NW node.

18. The UE of claim 17, wherein the CSI-RS configuration information defines a slot for the CSI-RS relative to a slot that includes an associated synchronization symbol block (SSB).

19. The UE of claim 18 wherein the CSI-RS configuration information comprises a slotConfig field in a ResourceConfigMobility information element IE that refers to a slot in the DRS resources.

20. The UE of claim 19, wherein the one or more processors are configured to cause the UE to:
receive the CSI-RS configuration information to the UE in a groupcast DCI transmission.

* * * * *